US009112310B2

(12) United States Patent
Shahohian et al.

(10) Patent No.: US 9,112,310 B2
(45) Date of Patent: Aug. 18, 2015

(54) SPARK GAP FOR HIGH-SPEED CABLE CONNECTORS

(75) Inventors: Erik James Shahohian, Orinda, CA (US); Vince Duperron, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 893 days.

(21) Appl. No.: 13/033,542

(22) Filed: Feb. 23, 2011

(65) Prior Publication Data

US 2012/0106018 A1 May 3, 2012

Related U.S. Application Data

(60) Provisional application No. 61/408,042, filed on Oct. 29, 2010, provisional application No. 61/360,436, filed on Jun. 30, 2010.

(51) Int. Cl.
*H02H 3/22* (2006.01)
*H01R 13/648* (2006.01)
*H01R 13/66* (2006.01)

(52) U.S. Cl.
CPC ........ *H01R 13/6485* (2013.01); *H01R 13/6658* (2013.01)

(58) Field of Classification Search
CPC ............... H01T 4/06; H01T 4/08; H01T 4/10; H01R 13/6485; H01R 13/6658
USPC .......................................................... 361/119
See application file for complete search history.

(56) References Cited

U.S. PATENT DOCUMENTS 3,581,143 A * 5/1971 Dornfeld ....................... 313/325
4,628,151 A 12/1986 Cardas
5,228,035 A 7/1993 Hirato et al.
5,313,465 A 5/1994 Perlman et al.
5,711,686 A 1/1998 O'Sullivan et al.

(Continued)

FOREIGN PATENT DOCUMENTS

CN 1168549 A 12/1997
CN 1351356 A 5/2002

(Continued)

OTHER PUBLICATIONS

Non-Final Office Action for U.S. Appl. No. 12/239,742, mailed on Dec. 7, 2012, 10 pages.

(Continued)

*Primary Examiner* — Jared Fureman
*Assistant Examiner* — Nicholas Ieva
(74) *Attorney, Agent, or Firm* — Kilpatrick Townsend & Stockton LLP

(57) ABSTRACT

Circuits, methods, and apparatus that may provide low-capacitance protection from electrostatic discharges. One example protects a circuit in a cable connector that is connected to cable connector contacts. This example may include a number of spark gaps that may be used for electrostatic discharge protection. These spark gaps may be formed using traces a printed circuit board. Signal traces to be protected may be routed such that they pass in close proximity to a ground pad, line, plane, area, or connection. When excessive electrostatic energy builds up on the signal trace, the energy may spark across a gap from the signal trace to the ground pad. The gap and parts of the signal traces and ground may be uncovered such that the electrostatic discharge may dissipate through the air.

23 Claims, 5 Drawing Sheets

(56) References Cited

U.S. PATENT DOCUMENTS

| | | | |
|---|---|---|---|
| 6,029,137 A | 2/2000 | Cordery et al. | |
| 6,169,251 B1 | 1/2001 | Grant et al. | |
| 6,485,335 B1 | 11/2002 | Dewdney | |
| 6,495,763 B1 | 12/2002 | Eichmann et al. | |
| 6,653,813 B2 | 11/2003 | Khatri | |
| 6,677,534 B2 | 1/2004 | Yamamoto et al. | |
| 6,792,474 B1 | 9/2004 | Hopprich et al. | |
| 6,798,790 B1 | 9/2004 | Enssle et al. | |
| 6,998,538 B1 | 2/2006 | Fetterolf, Sr. et al. | |
| 7,033,219 B2 | 4/2006 | Gordon et al. | |
| 7,174,413 B2 | 2/2007 | Pettey et al. | |
| 7,188,209 B2 | 3/2007 | Pettey et al. | |
| 7,197,549 B1 | 3/2007 | Salama et al. | |
| 7,219,183 B2 | 5/2007 | Pettey et al. | |
| 7,255,602 B1 | 8/2007 | Driessen et al. | |
| 7,323,640 B2 | 1/2008 | Takahashi et al. | |
| 7,366,182 B2 | 4/2008 | O'Neill | |
| 7,369,388 B2 * | 5/2008 | Cheung et al. | 361/111 |
| 7,422,471 B1 | 9/2008 | Wu | |
| 7,447,922 B1 | 11/2008 | Asbury et al. | |
| 7,466,712 B2 | 12/2008 | Makishima et al. | |
| 7,480,303 B1 | 1/2009 | Ngai | |
| 7,561,855 B2 | 7/2009 | Hofmeister et al. | |
| 7,562,176 B2 | 7/2009 | Kloeppner et al. | |
| 7,587,575 B2 | 9/2009 | Moertl et al. | |
| 7,689,755 B2 | 3/2010 | Balasubramanian et al. | |
| 7,743,197 B2 | 6/2010 | Chavan et al. | |
| 7,830,882 B2 | 11/2010 | Johnson | |
| 7,860,205 B1 | 12/2010 | Aweya et al. | |
| 7,944,200 B2 | 5/2011 | Endo et al. | |
| 8,312,302 B2 | 11/2012 | Baker et al. | |
| 8,327,536 B2 | 12/2012 | Kim et al. | |
| 8,380,912 B2 | 2/2013 | Jaramillo | |
| 8,463,881 B1 | 6/2013 | Baker et al. | |
| 8,516,238 B2 | 8/2013 | Cornelius et al. | |
| 8,683,190 B2 | 3/2014 | Cornelius et al. | |
| 8,862,912 B2 | 10/2014 | Baker et al. | |
| 8,966,134 B2 | 2/2015 | Anderson | |
| 8,976,799 B1 | 3/2015 | Baker et al. | |
| 2002/0010799 A1 | 1/2002 | Kubota et al. | |
| 2002/0093935 A1 | 7/2002 | Denney et al. | |
| 2003/0030720 A1 | 2/2003 | Hutchings | |
| 2003/0137997 A1 | 7/2003 | Keating | |
| 2004/0023645 A1 | 2/2004 | Olsen et al. | |
| 2004/0080544 A1 | 4/2004 | Stripling | |
| 2004/0115988 A1 | 6/2004 | Wu | |
| 2004/0196682 A1 | 10/2004 | Funaba et al. | |
| 2005/0025119 A1 | 2/2005 | Pettey et al. | |
| 2005/0044236 A1 | 2/2005 | Stafford | |
| 2005/0060470 A1 | 3/2005 | Main et al. | |
| 2005/0060480 A1 | 3/2005 | Solomon | |
| 2005/0111362 A1 | 5/2005 | Freytsis et al. | |
| 2005/0147119 A1 | 7/2005 | Tofano | |
| 2005/0238035 A1 | 10/2005 | Riley | |
| 2005/0262269 A1 | 11/2005 | Pike | |
| 2005/0281193 A1 | 12/2005 | Hofmeister et al. | |
| 2006/0023386 A1 * | 2/2006 | Palinkas et al. | 361/119 |
| 2006/0029038 A1 | 2/2006 | Jungck | |
| 2006/0083518 A1 | 4/2006 | Lee et al. | |
| 2006/0092928 A1 | 5/2006 | Pike et al. | |
| 2006/0168387 A1 | 7/2006 | Gan et al. | |
| 2006/0200600 A1 | 9/2006 | Groso | |
| 2006/0206655 A1 | 9/2006 | Chappell et al. | |
| 2006/0288098 A1 | 12/2006 | Singh et al. | |
| 2007/0011536 A1 | 1/2007 | Khanna et al. | |
| 2007/0025481 A1 | 2/2007 | Ryu et al. | |
| 2007/0074891 A1 | 4/2007 | Burke | |
| 2007/0086487 A1 | 4/2007 | Yasuda et al. | |
| 2007/0111597 A1 * | 5/2007 | Kondou et al. | 439/581 |
| 2007/0208899 A1 | 9/2007 | Freking et al. | |
| 2007/0266179 A1 | 11/2007 | Chavan et al. | |
| 2008/0065738 A1 | 3/2008 | Landers et al. | |
| 2008/0079462 A1 | 4/2008 | Chiu et al. | |
| 2008/0091857 A1 | 4/2008 | McDaniel | |
| 2008/0117909 A1 | 5/2008 | Johnson | |
| 2008/0123672 A1 | 5/2008 | Wilkinson | |
| 2008/0147898 A1 | 6/2008 | Freimuth et al. | |
| 2008/0172501 A1 | 7/2008 | Goodart et al. | |
| 2008/0195747 A1 | 8/2008 | Elmaliah | |
| 2008/0222338 A1 | 9/2008 | Balasubramanian | |
| 2008/0250175 A1 | 10/2008 | Sheafor | |
| 2008/0256445 A1 | 10/2008 | Olch et al. | |
| 2008/0266730 A1 * | 10/2008 | Viborg et al. | 361/56 |
| 2008/0279186 A1 | 11/2008 | Winter et al. | |
| 2008/0318348 A1 | 12/2008 | Grupen-Shemansky | |
| 2009/0003335 A1 | 1/2009 | Biran et al. | |
| 2009/0003361 A1 | 1/2009 | Bakthavathsalam | |
| 2009/0006710 A1 | 1/2009 | Daniel et al. | |
| 2009/0016348 A1 | 1/2009 | Norden et al. | |
| 2009/0022176 A1 | 1/2009 | Nguyen | |
| 2009/0037606 A1 | 2/2009 | Diab | |
| 2009/0063701 A1 | 3/2009 | Bagepalli et al. | |
| 2009/0070775 A1 | 3/2009 | Riley | |
| 2009/0117754 A1 | 5/2009 | Fields et al. | |
| 2009/0182917 A1 | 7/2009 | Kim | |
| 2009/0222924 A1 | 9/2009 | Droz et al. | |
| 2009/0279473 A1 | 11/2009 | Lu et al. | |
| 2010/0014598 A1 * | 1/2010 | Pfeifer | 375/257 |
| 2010/0046590 A1 | 2/2010 | Harper et al. | |
| 2010/0085091 A1 * | 4/2010 | Strazzieri et al. | 327/157 |
| 2010/0185792 A1 | 7/2010 | Yao et al. | |
| 2010/0303442 A1 | 12/2010 | Newton et al. | |
| 2011/0019383 A1 | 1/2011 | Aoyama et al. | |
| 2011/0167187 A1 | 7/2011 | Crumlin et al. | |
| 2011/0278043 A1 | 11/2011 | Ueda et al. | |
| 2012/0000703 A1 | 1/2012 | Kim et al. | |
| 2012/0000705 A1 | 1/2012 | Cornelius et al. | |
| 2012/0005394 A1 | 1/2012 | Goodart et al. | |
| 2012/0005496 A1 | 1/2012 | Baker et al. | |
| 2012/0103651 A1 | 5/2012 | Kim | |
| 2012/0104543 A1 | 5/2012 | Shahoian | |
| 2012/0152613 A1 | 6/2012 | Kim et al. | |
| 2012/0182223 A1 | 7/2012 | Zeng et al. | |
| 2012/0215950 A1 | 8/2012 | Anderson | |
| 2012/0226774 A1 | 9/2012 | Hochsprung | |
| 2012/0233489 A1 | 9/2012 | Cornelius et al. | |
| 2013/0173936 A1 | 7/2013 | Baker et al. | |
| 2014/0344615 A1 | 11/2014 | Cornelius et al. | |
| 2014/0359319 A1 | 12/2014 | Baker et al. | |

FOREIGN PATENT DOCUMENTS

| | | | |
|---|---|---|---|
| CN | 101010833 | A | 8/2007 |
| CN | 101248559 | A | 8/2008 |
| CN | 201215850 | Y | 4/2009 |
| CN | 201285827 | Y | 8/2009 |
| CN | 101803121 | A | 8/2010 |
| CN | 202678638 | U | 1/2013 |
| CN | 202797544 | U | 3/2013 |
| EP | 1202419 | A1 | 5/2002 |
| EP | 2090955 | A1 | 8/2009 |
| JP | 57-064083 | U | 4/1982 |
| JP | H08-265600 | | 10/1996 |
| JP | 2000-077141 | A | 3/2000 |
| JP | 2001-109697 | A | 4/2001 |
| JP | 2003-189263 | A | 7/2003 |
| JP | 2004-095518 | A | 3/2004 |
| JP | 2004-193090 | A | 7/2004 |
| JP | 2005-521368 | A | 7/2005 |
| JP | 2005-243446 | A | 9/2005 |
| JP | 2005-309744 | A | 11/2005 |
| JP | 2006-048594 | A | 2/2006 |
| JP | 2007-251779 | A | 9/2007 |
| JP | 2008-252310 | A | 10/2008 |
| JP | 2009-076375 | A | 4/2009 |
| JP | 2009-123561 | A | 6/2009 |
| KR | 20090079879 | A | 7/2009 |
| TW | 200303126 | A | 8/2003 |
| TW | 589563 | B | 6/2004 |
| TW | I239127 | B | 9/2005 |
| TW | 200627322 | A | 8/2006 |
| TW | 200838085 | A | 9/2008 |
| TW | 200909825 | A | 3/2009 |
| WO | 2006/102606 | A2 | 9/2006 |

(56) References Cited

FOREIGN PATENT DOCUMENTS

| | | | |
|---|---|---|---|
| WO | 2006/102606 | A3 | 9/2006 |
| WO | 2007/099507 | A2 | 9/2007 |
| WO | 2009/039287 | A2 | 3/2009 |
| WO | 2009/039287 | A3 | 3/2009 |
| WO | 2009/046617 | A1 | 4/2009 |
| WO | 2009/086566 | A1 | 7/2009 |
| WO | 2010/051281 | A2 | 5/2010 |
| WO | 2010051281 | A3 | 5/2010 |
| WO | 2012/003347 | A1 | 1/2012 |
| WO | 2012/003381 | A2 | 1/2012 |
| WO | 2012/003385 | A1 | 1/2012 |

OTHER PUBLICATIONS

Office Action for Japanese Patent Application No. 2012-543350, mailed on Dec. 28, 2012, in 4 pages.

Display Port, Wikipedia, the free encyclopedia, 4 pages; printed on Aug. 29, 2008 from http://en.wikipedia.org/wiki/Displayport; page states it was last modified on Aug. 25, 2008.

Dopplinger, A., et al. "Using IEEE 1588 for synchronization of network-connected devices", Mar. 29, 2007, from www.embedded.com/columns/technicalinsights/, 7 pages.

Ethernet, Wikipedia, the free encyclopedia, 9 pages; printed on Aug. 17, 2008, from http://en.wikipedia.org/wiki/Ethernet; page states it was last modified on Aug. 17, 2008.

IDT 24-Lane 3-Port PCI Express, 89HPES24N3 Data Sheet, Jul. 18, 2006, 30 pages.

IEEE 1394 interface, Wikipedia, the free encyclopedia, 7 pages; printed on Jul. 24, 2008 from http://en.wikipedia.org/wiki/Firewire; page states it was last modified on Jul. 23, 2008.

PCI Express, Wikipedia, the free encyclopedia, 11 pages; printed on Jul. 24, 2008 from http://en.wikipedia.org/wiki/PCI-Express; page states it was last modified on Jul. 16, 2008.

PCI Express Architecture, Chapter 3, Address Spaces & Transaction Routing, from PCIEX.book, pp. 105-152, Aug. 5, 2003.

PCI Express Base Specification Revision 1.0a, Apr. 15, 2003, pp. 1-426.

PCI-X, Wikipedia, the free encyclopedia, 4 pages; printed on Sep. 9, 2008 from http://en.wikipedia.org/wiki/PCI-X; page states it was last modified on Sep. 4, 2008.

Peer-to-peer, Wikipedia, the free encyclopedia, 11 pages; printed on Jul. 24, 2008 from http://en.wikipedia.org/wiki/Peer-to-peer; page states it was last modified on Jul. 24, 2008.

Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.

Universal Serial Bus, Wikipedia, the free encyclopedia, 17 pages; printed on Jul. 24, 2008 from http://en.wikipedia.org/wiki/USB; page states it was last modified on Jul. 23, 2008.

VESA DisplayPort Standard, Version 1, Revision la, Jan. 11, 2008, 238 pages.

International Search Report and Written Opinion for Application No. PCT/US2011/042634 mailed on Nov. 30, 2011, 20 pages.

International Search Report and Written Opinion for Application No. PCT/US2011/042684 mailed on Jan. 31, 2012, 18 pages.

International Search Report and Written Opinion for Application No. PCT/US2011/042689 mailed on Sep. 28, 2011, 23 pages.

Non-Final Office Action for U.S. Appl. No. 13/480,345, mailed Apr. 1, 2013, 6 pages.

Notice of Allowance for U.S. Appl. No. 12/239,743, mailed Feb. 19, 2013, 18 pages.

Notice of Allowance for U.S. Appl. No. 13/173,739, mailed May 13, 2013, 11 pages.

Notice of Allowance for U.S. Appl. No. 13/173,979, mailed on Jul. 11, 2012, 5 pages.

Non-Final Office Action for U.S. Appl. No. 13/615,642, mailed Apr. 12, 2013, 8 pages.

Final Office Action for U.S. Appl. No. 12/239,742, mailed on Oct. 15, 2010, 14 pages.

Final Office Action for U.S. Patent No. 12/239,743, mailed on Nov. 12, 2010, 15 pages.

International Preliminary Report on Patentability for PCT Application No. PCT/US2011/042684, mailed on Jan. 17, 2013, 12 pages.

International Preliminary Report on Patentability for PCT Application No. PCT/US2011/042634, mailed on Jan. 17, 2013, 13 pages.

International Preliminary Report on Patentability for PCT Application No. PCT/US2011/042689, mailed on Jan. 17, 2013, 7 pages.

Non-Final Office Action for U.S. Appl. No. 12/239,742, mailed on Apr. 28, 2010, 14 pages.

Non-Final Office Action for U.S. Appl. No. 12/239,743 mailed on Jun. 21, 2012, 15 pages.

Non-Final Office Action for U.S. Appl. No. 12/239,743, mailed on May 25, 2010, 10 pages.

Non-Final Office Action for U.S. Appl. No. 13/173,979, mailed on Mar. 15, 2012, 8 pages.

Notice of Allowance for U.S. Appl. No. 13/033,562, mailed on Aug. 8, 2012, 6 pages.

Office Action for European Patent Application No. 11743164.3, mailed Mar. 5, 2013, 2 pages.

Notice of Allowance for Japanese Patent Application No. 2012-543350, mailed on Mar. 12, 2013, in 3 pages.

Office Action for Japanese Patent Application No. 2012-541240, mailed on Oct. 26, 2012, 3 pages.

Notice of Allowance for Japanese Patent Application No. 2012-541240, mailed on Apr. 30, 2013, 3 pages.

Office Action for Chinese Patent Application No. 201120235164.4, mailed on May 4, 2012, with English translation, 2 pages.

Notice of Allowance for Chinese Patent Application No. 201120235164.4, mailed on Sep. 17, 2012, with English translation, 4 pages.

Notice of Allowance for Chinese Patent Application No. 201120235144.7, mailed on Mar. 1, 2012, with English Translation, 4 pages.

Final Office Action mailed on Jul. 8, 2013 for U.S. App. No. 12/239,742, 14 pages.

Non-Final Office Action mailed on Jul. 9, 2013 for U.S. Appl. No. 13/033,553, 17 pages.

Office Action for Chinese Patent Application No. 201110189140.4, mailed on Aug. 19, 2013, 11 pages.

Japanese Notice of Allowance mailed on Aug. 5, 2013 for JP Patent Application No. 2012-547345, 3 pages.

Non-Final Office Action mailed on Sep. 9, 2013 for U.S. Appl. No. 13/249,260, 21 pages.

Chinese Office Action mailed on Sep. 18, 2013 for CN Patent Application No. 201110189137.2, with English Translation, 14 pages.

Chinese Office Action mailed on Sep. 24, 2013 for CN Patent Application No. 201110189138.7, with English Translation, 10 pages.

Non-Final Office Action mailed on Oct. 3, 2013 for U.S. Appl. No. 13/403,209, 18 pages.

Salvator, Dave; "Business Wire on Intel Announces Thunderbolt Technology,"; Feb. 24, 2013, 3 pages.

Pang, Tiffany; TI Introduces High-Performance, Dual-Mode DisplayPort Switches and DHMI/DVI Level Translations; Connects new PC Video Standard to Monitors and TVs,; Mar. 11, 2008, 3 pages.

Texas Instruments; "DisplayPort Switch,"; Feb. 2008, 25 pages.

Texas Instruments; "DisplayPort Switch,"; Jan. 2008, revised Mar. 2008, 56 pages.

Final Office Action for U.S. App. No. 13/615,642, mailed Oct. 23, 2013, 11 pages.

Notice of Allowance for U.S. Appl. No. 13/480,345, mailed Oct. 30, 2013, 7 pages.

Non-Final Office Action for U.S. Appl. No. 12/239,742, mailed Nov. 22, 2013, 11 pages.

Non-Final Office Action for U.S. Appl. No. 13/403,182, mailed Dec. 20, 2013, 14 pages.

Final Office Action for U.S. Appl. No. 13/033,553, mailed Mar. 10, 2014, 16 pages.

Notice of Allowance for U.S. Appl. No. 13/615,642, mailed Apr. 30, 2014, 5 pages.

Final Office Action mailed on May 23, 2014 for U.S. Appl. No. 13/403,209, 28 pages.

(56) References Cited

OTHER PUBLICATIONS

Final Office Action for U.S. Appl. No. 13/403,182, mailed Jun. 11, 2014, 13 pages.
Final Office Action for U.S. Appl. No. 12/239,742, mailed Jul. 8, 2014, 19 pages.
Notice of Allowance mailed on Oct. 17, 2014, for U.S. Appl. No. 13/403,182, 7 pages.
Non-Final Office Action mailed on Nov. 5, 2014 for U.S. Appl. No. 14/218,877, 4 pages.
Notice of Allowance mailed on Jan. 13, 2015 for U.S. Appl. No. 12/239,742, 12 pages.
Non-Final Office Action mailed on Mar. 16, 2015 for U.S. Appl. No. 13/403,209, 35 pages.

* cited by examiner

SPARK GAP FOR HIGH-SPEED CABLE CONNECTORS

CROSS-REFERENCES TO RELATED APPLICATIONS

This application claims the benefit of U.S. provisional application Nos. 61/408,042, filed on Oct. 29, 2010, titled "Spark Gap for High-Speed Cable Connectors," and 61/360,436, filed on Jun. 30, 2010, titled "HSIO Cable Deskew," which are incorporated by reference.

BACKGROUND OF THE INVENTION

The amount of data transferred between electronic devices has grown tremendously the last few years. Large amounts of audio, video, text, and other types of data content are now regularly transferred among computers, media devices, such as handheld media devices, displays, storage devices, and other types of electronic devices. Since it is often desirable to transfer this data rapidly, the data rates of these data transfers have substantially increased.

Transferring data at these rates has proven to require a new type of cable. Conventional, passive cables create excessive skew between high-speed signals and generate large amounts of electromagnetic emissions that degrade signal quality. Because of this, active cables are being developed to support the high data rates among these electronic devices. These active cables may include electronic circuits that receive, retime, and retransmit data to and from a far end of the cable. These circuits receive and provide signals on connector contacts, which are typically located in connector inserts at each end of the cable.

But these high speed cables are susceptible to damage. For example, static charge can build up on a user of these cables. The user may touch one or more contacts at a cable's connector. This in turn may cause a discharge of the static that has built up on the user, resulting in a transfer of charge from the user to the connector contact. This discharge of static is commonly referred to as electrostatic discharge (ESD). Without proper protection, this discharge can cause excessive voltages to appear at the electronic circuits located in these new, high-speed cables.

Traditionally, ESD protection involves the use of diodes or other junctions that conduct the discharge current safely to ground. Unfortunately, these diodes and other junctions add capacitance to the signal lines that are being protected. These capacitances slow signal edges and degrade high-speed performance.

Thus, what is needed are circuits, methods, apparatus, and other structures that can provide low-capacitance protection from electrostatic discharges at cable connector contacts, as well as other applications.

SUMMARY

Accordingly, embodiments of the present invention provide circuits, methods, apparatus, and other structures that can provide low-capacitance protection from electrostatic discharges. While embodiments of the present invention are particularly suited to use in protecting circuitry connected to cable connector contacts, they may be used in other applications as well.

An exemplary embodiment of the present invention may include a plurality of spark gaps that may be used for electrostatic discharge protection. These spark gaps may be formed using traces on printed circuit boards or other appropriate substrates in the cable connectors. Signal traces to be protected may be routed such that they pass in close proximity to a ground pad, line, plane, area, connection, or other appropriate structure, which is referred to here as a ground pad for simplicity. When excessive electrostatic energy builds up on the signal trace, the energy may spark across a gap from the signal trace to a ground pad. The gap and parts of the signal traces and ground may be uncovered such that the electrostatic discharge may dissipate through the air.

One exemplary embodiment of the present invention provides a connector insert. This connector insert may include a printed circuit board. The printed circuit board may be a multilayer board having a ground plane. The printed circuit board may also have a number of traces printed on one or more outside surfaces, where one or more of these traces are in proximity to a ground pad. The ground pad may connect to the ground plane through one or more vias. Spark gaps may be formed between the one or more traces and the ground pad. A portion of one or more of the traces near the ground pad may be rounded, or it may have another type of shape. A protective covering may cover the printed circuit board. The protective cover may be formed using plastic or other appropriate material. The protective covering may have a first opening over portions of one or more traces, one or more of the corresponding spark gaps, and the ground pad.

This exemplary embodiment of the present invention may further include an integrated circuit located on the printed circuit board. The integrated circuit may include a clock and data recovery circuit. The integrated circuit may be coupled to one or more of the traces. A number of connector contacts may attach to the printed circuit board. The protective covering may have a second opening to allow one or more of the connector contacts to attach to one or more of the traces on the printed circuit board. The printed circuit board may include one or more other traces that attach to conductors of a cable.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
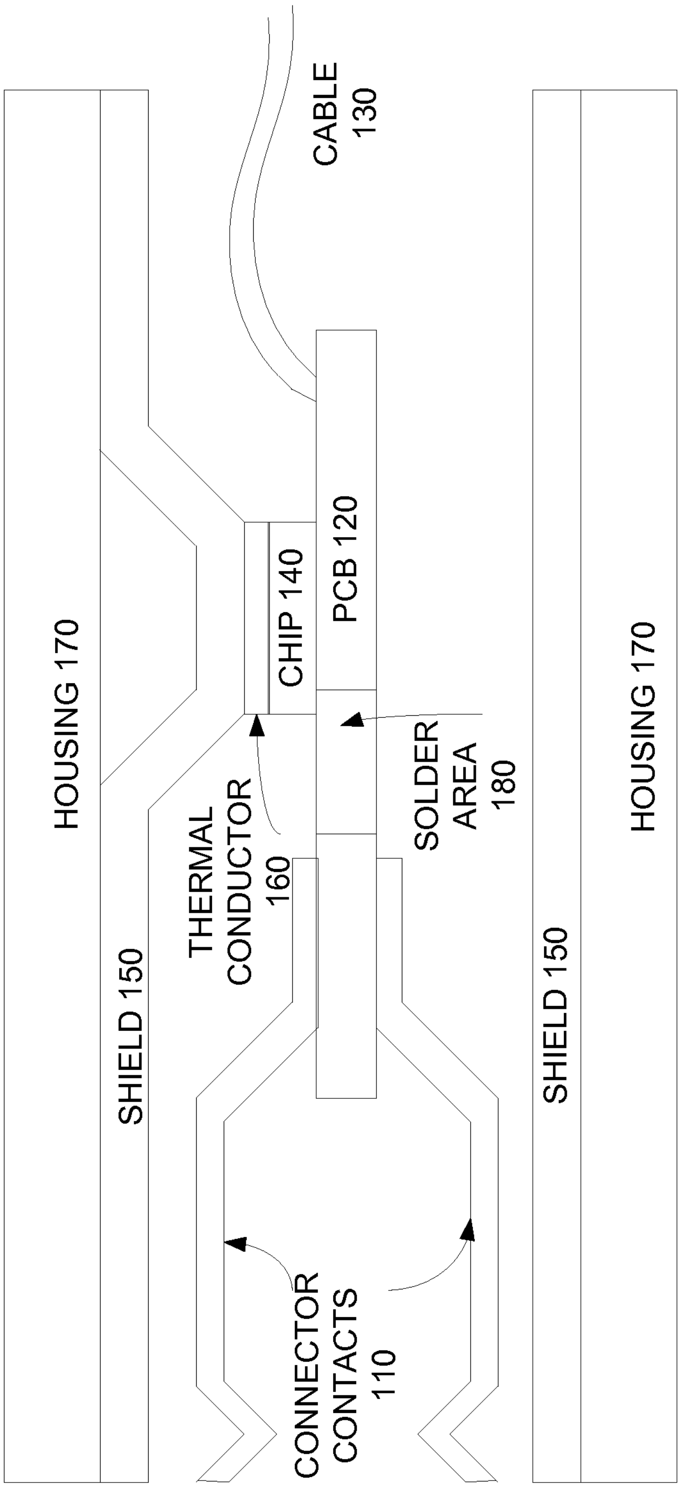
FIG. 1 illustrates a connector insert according to an embodiment of the present invention.

FIG. 1 illustrates a connector insert or connector plug according to an embodiment of the present invention. This figure, as with the other included figures, is shown for illustrative purposes and does not limit either the possible embodiments of the present invention or the claims.

This connector insert may be part of an active cable for high-speed data communications. This connector insert may also be part of a docking station or other electronic device or connection to another electronic device. This connector insert may include connector contacts 110, which may mate with connector contacts of a connector receptacle (not shown). Connector contacts 110 may mechanically attach to printed circuit board 120. These connector contacts 110 may electrically connect to chip 140 using traces on printed circuit board 120. Connector contacts 110 and chip 140 may connect to wires and cable 130 via traces on printed circuit board 120.

A thermal conductor layer 160 may be used to provide a thermal path from chip 140 to shield 150. A solder area 180, which may be on the side or top of printed circuit board 120, may be soldered to a portion of shield 150, thereby creating a low thermal resistance path for heat dissipation. Housing 170 may be used to surround shield 150.

Again, circuitry in these connector inserts, such as chip 140, may need to be protected from ESD. Typically, ESD protection is connected to signal traces in the connector insert that are connected to chip 140. Unfortunately, conventional electrostatic discharge protection relies on diodes or junctions, which create excessive capacitance on signal traces that slow edges and thereby degrade cable performance. Accordingly, embodiments of the present invention do not rely on diodes or junctions, but instead include a spark gap. Examples of spark gaps according to embodiments of the present invention are shown in the following figures.

Figures 2, 3, 4:
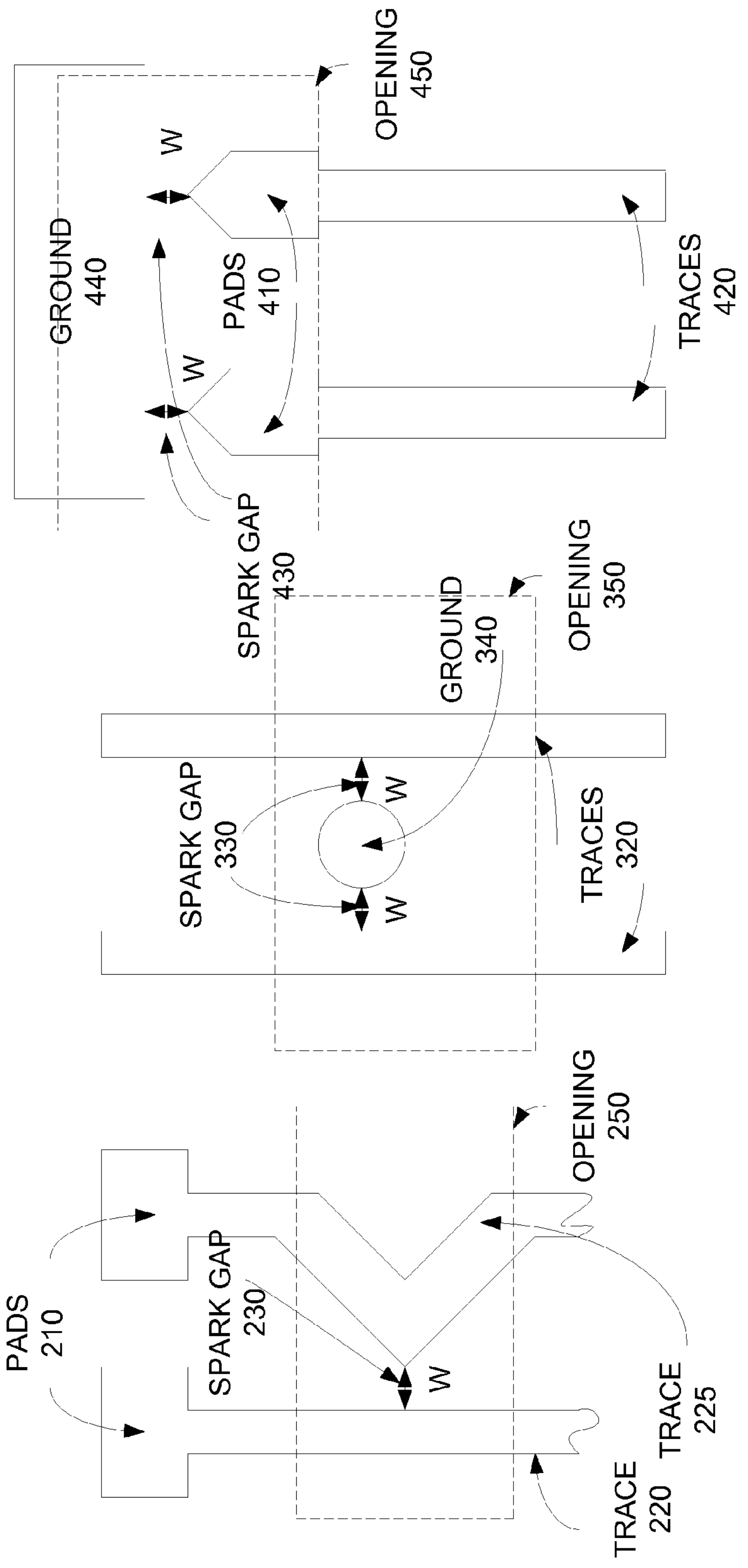
FIG. 2 illustrates the layout of a spark gap according to an embodiment of the present invention.
FIG. 3 illustrates the layout of a spark gap according to another embodiment of the present invention.
FIG. 4 illustrates the layout of a spark gap according to another embodiment of the present invention.

FIG. 2 illustrates the layout of a spark gap according to an embodiment of the present invention. In this example, two traces, trace 220 and trace 225, may be configured such that they approach each other a distance "W" at spark gap 230. Cable wires or insert connectors may attach to pads 210. Conventionally, one trace may be ground, while the other trace may be a signal path. As electrostatic builds up between these two traces 220 and 225, a discharge across spark gap 230 may dissipate the energy. An opening 250 may be included such that the spark may cross through the air from one trace to another.

FIG. 3 illustrates the layout of the spark gap according to another embodiment of the present invention. In this example, two traces 320 may be used to protect circuitry by including spark gaps 330 to ground path 340. Again, an opening 350 may be included such that a spark may be dissipated through the air.

FIG. 4 illustrates the layout of a spark gap according to another embodiment of the present invention. In this example, pads 410 may couple to traces 420 and may further attach to cable wires or insert connectors. A spark gap 430 to ground 440 may be included for each pad 410. Again, an opening 450 may be included.

Figure 5:
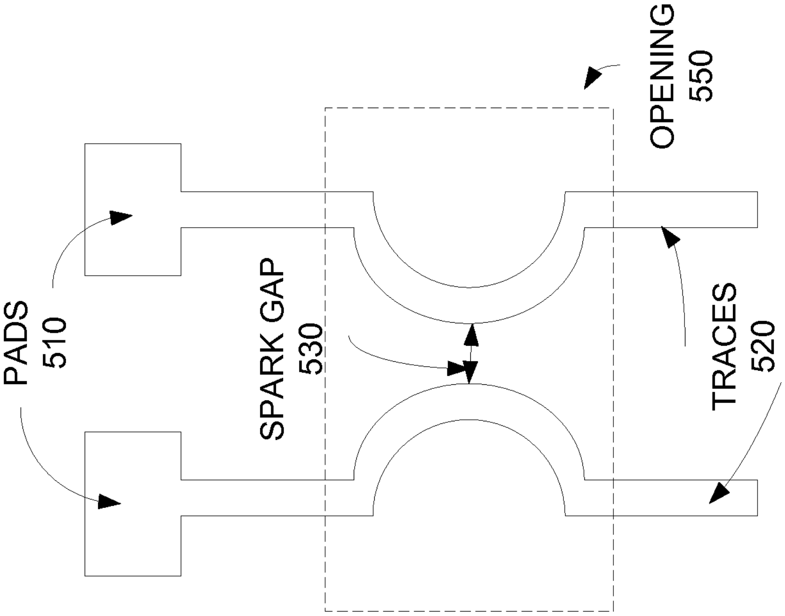
FIG. 5 illustrates the layout of another spark gap according to an embodiment of the present invention.

FIG. 5 illustrates the layout of another spark gap according to an embodiment of the present invention. In this example, pads 510 may couple to traces 520, which may curve near each other, thereby forming spark gap 530. Again, an opening 550 may be included.

Figure 6:
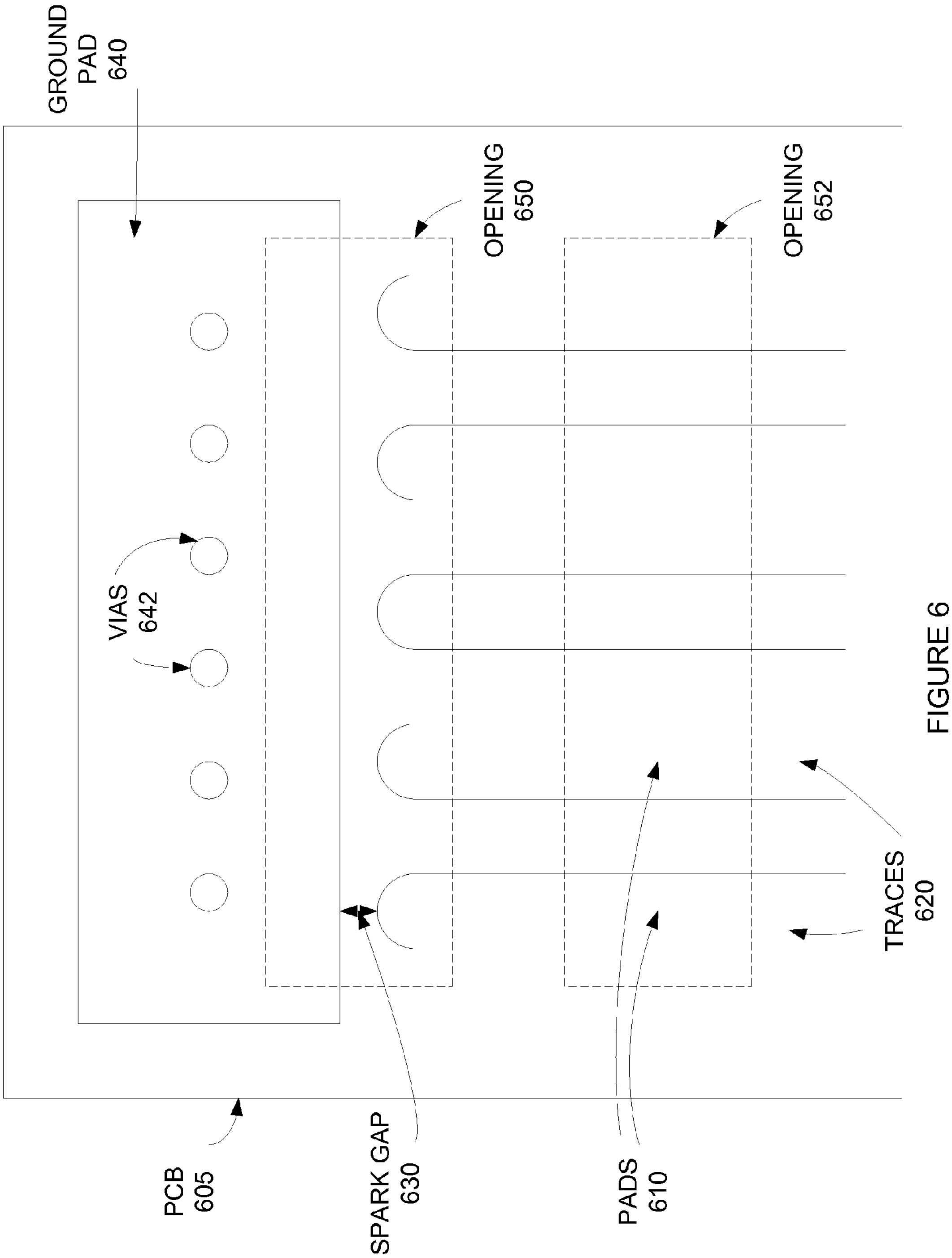
FIG. 6 illustrates the layout of a portion of a printed circuit board including a number of traces and a ground pad forming a number of spark gaps according to an embodiment of the present invention.

FIG. 6 illustrates a top view of a portion of a printed circuit board 605 according to an embodiment of the present invention. Printed circuit board 605 may reside in a connector insert, such as the connector insert shown in FIG. 1. A number of traces 620 may be located on printed circuit board 605. Ground pad 640 may also be included on printed circuit board 605. Traces 620 may have rounded edges that face ground pad 640. The rounded portions of traces 620 and ground pad 640 may form spark gaps 630.

A protective coating may cover portions of printed circuit board 605. This protective coating may include opening 650. Opening 650 may provide an opening in a coating that covers printed circuit board 605. Again, this coating may be plastic or other material. Opening 650 may provide an opening over a portion of traces 620, ground pad 640, and spark gaps 630. A second opening 652 may be included over a portion of traces 620 away from ground pad 640. These openings may form pads 610. Pads 610 may be used to connect traces 620 to connector contacts (not shown).

Ground pad 640 may connect to a ground plane (not shown), which is typically embedded in printed circuit board 605. In this example, this connection may be made using vias 642.

This structure may provide electrostatic discharge protection for high-speed cable inserts as well as for other applications. This protection may be achieved without incurring excessive capacitance on traces 620. This protection may also be achieved at an extremely low cost, the cost being primarily printed circuit board area for ground pad 640, and manufacturing costs associated with vias 642.

If a user touches a connector contact (not shown) such that an electrostatic discharge occurs, charge may be transferred via the connector contact to a pad 610. This charge may then flow through a trace 620 and jump across spark gap 630, where it is dissipated to ground via ground pad 640.

Again, spark gaps 630 may be used in a number of applications. One particular application is a connector insert, such as the connector insert shown in FIG. 1. A more detailed view of the connector insert of FIG. 1 is shown below.

Figure 7:
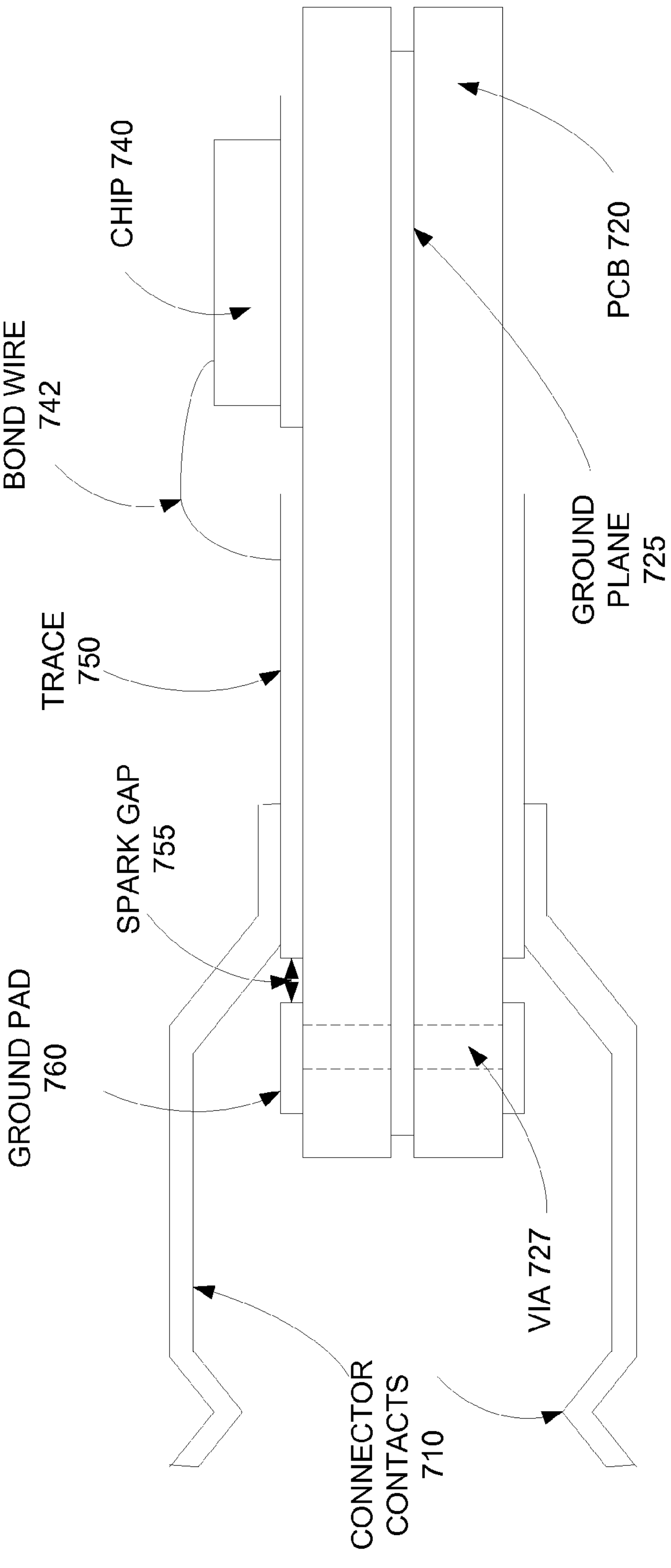
FIG. 7 illustrates a side view of a portion of a connector insert according to embodiment of the present invention.

FIG. 7 illustrates a side view of a portion of a connector insert or connector plug according to embodiment of the present invention. This example illustrates a printed circuit board 720. Printed circuit board 720 may be a multilayer printed circuit board. Printed circuit board 720 may include a ground plane 725. This ground plane 725 may be formed of a layer of metal or other conducting material between two layers of the printed circuit board 720. Ground plane 725 may connect to ground pad 760 using vias 727.

Traces 750 may be included on printed circuit board 720. Spark gap 755 may be formed between traces 750 and ground pad 760. Connector contacts 710 may contact one or more traces 750. An integrated circuit 740 may be located on printed circuit board 720. Integrated circuit 740 may connect to one or more traces 750 using bond wires 742.

With this configuration, spark gap 755 protects integrated circuit 740 from electrostatic discharges that reach connector contacts 710. Specifically, charges that reach connector contacts 710 flow to traces 750. From there, they can jump spark gap 755 to reach ground pad 760. Once at ground pad 760, the charge dissipates to ground through the vias 727 and ground plane 725. This prevents much of the charge from reaching bond wire 742 and integrated circuit 740. In other embodiments of the present invention, other traces, such as traces coupled to a cable, may be protected from electrostatic discharge.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Thus, it will be appreciated that the invention is intended to cover all modifications and equivalents within the scope of the following claims.

What is claimed is:

1. A connector insert comprising:

a printed circuit board;

a plurality of first traces located on a top side of the printed circuit board;

a plurality of first connector contacts, each first connector contact attached to one of the plurality of first traces and having connector contact portions above the printed circuit board;

an integrated circuit coupled to at least a first trace in the plurality of first traces, wherein a first length of the first trace extends from a first connector contact to the integrated circuit;

a first ground pad located on the top side of the printed circuit board such that a plurality of first spark gaps are formed under the connector contact portions of the plurality of first connector contacts, each first spark gap formed between a trace in the plurality of first traces and the first ground pad, wherein a second length of the first trace extends from the first connector contact to a corresponding first spark gap; and a protective covering over the printed circuit board, the protective covering having a first opening over at least a first portion of the second length of the first trace, a portion of the first ground pad, and the corresponding first spark gap.

2. The connector insert of claim 1 wherein the printed circuit board is a multilayer board and comprises a ground plane, and wherein the connector insert further comprises:

a plurality of second traces on a bottom side of the printed circuit board;

a plurality of second connector contacts, each second connector contact coupled to one of the plurality of second traces and having connector contact portions below the printed circuit board; and a second ground pad located on the bottom side of the printed circuit board such that a plurality of second spark gaps are formed above the connector contact portions of the plurality of first connector contacts, each second spark gap formed between a trace in the plurality of second traces and the second ground pad.

3. The connector insert of claim 2 wherein the first ground pad and the second ground pad are coupled to the ground plane using a plurality of vias.

4. The connector insert of claim 1 wherein the first trace has a first rounded end.

5. The connector insert of claim 4 wherein the first rounded edge faces the first ground pad to form the corresponding first spark gap.

6. The connector insert of claim 1 wherein the first trace is configured to convey a signal.

7. The connector insert of claim 1 wherein the connector contacts are arranged to mate with connector contacts in a connector receptacle.

8. The connector insert of claim 1 wherein the integrated circuit comprises a clock and data recovery circuit.

9. The connector insert of claim 1 wherein the protective covering comprises plastic.

10. The connector insert of claim 1 wherein the protective covering further comprises a second opening, the second opening at least over a second portion of the first trace to allow contact by one of the plurality of connector contacts.

11. A cable assembly comprising:

a cable comprising a plurality of conductors and having two ends; and two connector inserts, one connector insert on each end of the cable, wherein each connector insert comprises:

a printed circuit board;

a plurality of first traces on a top side of the printed circuit board;

a plurality of second traces on the printed circuit board, each coupled to a conductor in the cable;

a plurality of first connector contacts, each first connector contact coupled to one of the plurality of first traces and having connector contact portions above the printed circuit board;

an integrated circuit coupled to at least a first trace in the plurality of first traces, wherein a first length of the first trace extends from a first connector contact to the integrated circuit;

a first ground pad located on the top side of the printed circuit board such that a plurality of first spark gaps are formed under the connector contact portions of the plurality of first connector contacts, each first spark gap formed between a trace in the plurality of first traces and the first ground pad, wherein a second length of the first trace extends from the first connector contact to a corresponding first spark gap; and a protective covering over the printed circuit board, the protective covering having a first opening over at least a first portion of the second length of the first trace, a portion of the first ground pad, and the corresponding first spark gap.

12. The cable assembly of claim 11 wherein the plurality of conductors comprises a pair of conductors to carry a high-speed differential signal.

13. The cable assembly of claim 11 wherein the plurality of conductors comprises a conductor to carry a high-speed single-ended signal.

14. The cable assembly of claim 11 wherein each connector insert further comprises:

a plurality of third traces on a bottom side of the printed circuit board; a plurality of second connector contacts, each second connector contact coupled to one of the plurality of third traces and having connector contact portions below the printed circuit board; and a second ground pad located on the bottom side of the primed circuit board such that a plurality of second spark gaps are formed above the connector contact portions of the plurality of first connector contacts, each second spark gap formed between a trace in the plurality of third traces and the second ground pad.

15. The cable assembly of claim 14 wherein the second plurality of traces are located on a first side of the printed circuit board.

16. A connector insert comprising:

a printed circuit board;

a plurality of first traces located on a top side of the printed circuit board;

a plurality of first connector contacts, each first connector contact contacting one of the plurality of first traces and having connector contact portions above the printed circuit board;

a plurality of second traces located on the printed circuit board, the plurality of second traces for coupling to conductors of a cable;

an integrated circuit coupled to at least a first trace in the plurality of first traces, wherein a first length of the first trace extends from a first connector contact to the integrated circuit;

a first ground pad located on the top side of the printed circuit board such that a plurality of first spark gaps are formed under the connector contact portions of the plurality of first connector contacts, each first spark gap formed between a trace in the first plurality of first traces and the first ground pad, wherein a second length of the first trace extends from the first connector contact to a corresponding first spark gap; and a protective covering over the printed circuit board, the protective covering having a first opening over at least a first portion of the first trace, a portion of the first ground pad, and the corresponding first spark gap.

17. The connector insert of claim 16 wherein the protective covering further comprises a second opening for allowing one of the connector contacts to contact one of the first plurality of traces.

18. The connector insert of claim 16 wherein the integrated circuit comprises a clock and data recovery circuit.

19. The connector insert of claim 16 further comprising:

a plurality of third traces on a bottom side of the printed circuit board;

a plurality of second connector contacts, each second connector contact coupled to one of the plurality of third traces and having connector contact portions below the printed circuit board; and a second ground pad located on the bottom side of the printed circuit board such that a plurality of second spark gaps are formed above the connector contact portions of the plurality of first connector contacts, each second spark gap formed between a trace in the plurality of third traces and the second ground pad.

20. The connector insert of claim 16 wherein the printed circuit board comprises a ground plane and wherein the ground plane couples to the ground pad using a plurality of vias.

21. The connector insert of claim 1 wherein a first length of the first trace extends in a first direction from a first connector contact to the integrated circuit a second length of the first trace extends in a second direction from the first connector contact to a corresponding spark gap, the second direction opposite the first direction.

22. The cable assembly of claim 11 wherein a first length of the first trace extends in a first direction from a first connector contact to the integrated circuit a second length of the first trace extends in a second direction from the first connector contact to a corresponding spark gap, the second direction opposite the first direction.

23. The connector insert of claim 16 wherein a first length of the first trace extends in a first direction from a first connector contact to the integrated circuit a second length of the first trace extends in a second direction from the first connector contact to a corresponding spark gap, the second direction opposite the first direction.

* * * * *